Patented Apr. 10, 1945

2,373,632

UNITED STATES PATENT OFFICE 2,373,632

REMOVAL OF FLUORINE FROM WATER

Robert J. Myers, Rydal, and Donald S. Herr, Philadelphia, Pa., assignors to The Resinous Products & Chemical Company, Philadelphia, Pa., a corporation of Delaware No Drawing. Application June 24, 1942,
Serial No. 448,329

14 Claims. (Cl. 210—24)

This invention deals with the removal of small amounts of fluorine in the form of its compounds from water contaminated therewith in order to render the water harmless.

The harmful effects of water supplies containing small amounts of fluorine compounds are well known. It has been established, however, that reduction of fluorines to about 1 P. P. M. or less from water otherwise potable renders the treated water fit for various industrial uses, fit for human consumption and without danger of causing defects in bones or teeth.

The problem of reducing the fluorine content of water has been approached in various ways. It has been proposed, for example, that this objectionable component be precipitated, but the least soluble fluoride is still soluble above the limit tolerated by human beings. It has also been proposed that water be desalted by proper use of base exchangers in their hydrogen form followed by so-called anion exchangers. This method is needlessly uneconomical in nature, since the usual salt content of water is unobjectionable. It has also been proposed to reduce fluoride concentrations by selective sorption on the surface of a solid.

While previously suggested sorption methods have definite advantages over the other named methods, the method here described has many advantages over other sorption methods and meets the requirements for an ideal procedure of removing fluorides from water. The desirable characteristics for the process are (1) very low solubility of purifying agent or agents in water, (2) large effective surface area for speeding up the process, (3) freedom from formation of colloidal material in water, (4) retention or improvement of potability of water, (5) economy of operation, (6) ease of control of operation, (7) possibility of continuous rather than batch-wise operation, and (8) repeated regeneration of the absorbing agent to a state of high activity.

Previously proposed sorptive agents have failed in one or more of the above requirements, some disintegrating too readily, others wasting away rapidly on regeneration or not returning to their original activity on regeneration, while still others lack the capacity, efficiency, or economy necessary for the purification of large volumes of water in an economic manner.

It is an object of this invention to provide a method which meets the above requirements for a process for the removal of fluorine in the form of its compounds dissolved in water. It is also an object to reduce the fluoride content of otherwise potable water below one part per million. It is also an object to absorb fluorides selectively without introducing soluble reagents. It is a further object to treat water at the pH's normally encountered in water supplies without requiring or causing violent changes in pH.

It has been found that these objects are accomplished by contacting a fluorine-containing water with an anion exchange resin which has been impregnated with an aqueous solution of an aluminum salt.

As an anion exchange resin there may be used the insolubilized resin resulting from the reaction of diamino benzenes, particularly meta phenylene diamine, and formaldehyde, or the reaction of a methylol-forming phenol, formaldehyde, and a primary or secondary non-aromatic amine, particularly polyalkylene polyamines, or the reaction of ketones or polyhalides with polyalkylene polyamines, or reaction involving a combination of the various above mentioned materials. The preparation of particularly effective and efficient resins suitable for so-called anion exchange or, more strictly speaking, the absorption of acidic constituents from fluids is described in applications Serial Nos. 387,679; 387,683; 387,684; 387,685; 387,686; 387,687 and 387,688 filed April 9, 1941. The resins there described are gelled and heat-hardened phenol-formaldehyde type resins having aminomethyl substituents of the phenyl nuclei.

In order to render these resins effective for the removal of fluorine from compounds thereof from water the resin in a granular form is impregnated with an aqueous solution of an aluminum salt. It is then desirable to rinse the impregnated resin to free it from solution of salt prior to treatment of fluorine-containing water. If desired, rinsing may be done with a portion of fluorine-containing water which may be discarded before the bulk of the water to be treated is contacted with the impregnated resin, or desalted water may desirably be used.

For the optimum use of the anion exchange resins it is desirable that free, flocculent hydrated alumina is not formed as the result of free alkali on the resin. It is, therefore, desirable to rinse the anion exchange resin thoroughly before impregnation is performed or better to treat the resin with a very dilute solution of an acid. The best results are obtained when sufficient acid is used to convert about 1% to about 6% of the resin to the acid form before impregnation with the aluminum salt.

After the resin has been properly prepared, it is contacted with the fluorine-containing water. This may be done by stirring the resin with a batch of water and separating resin and treated water. A more efficient method, however, is to flow the fluorine-containing water through a bed of the treated anion-exchange resin. When the treated resin has become saturated with fluorine, it is readily regenerated by treatment with an alkaline solution, such as an aqueous solution of sodium hydroxide, ammonium hydroxide, sodium carbonate, or the like. The regenerant solution may be concentrated for recovery of its fluorine content. The resin may then be rinsed, treated with a dilute solution of an acid, such as hydrochloric, sulfuric, acetic, etc., subjected to the action of an aluminum salt, and used again for the removal of fluorine. Thus, the anion exchange resins are capable of repeated use and regeneration.

In treating the resin with an aluminum salt solution it is preferable to treat the resin by upflow, because the solution of aluminum salt causes a considerable and rapid increase in volume of the resin. Other operations are performed in general equally well by either upflow or downflow. As an aluminum salt there may be used a sulfate, chloride, nitrate, acetate, or other soluble salt, including alums. The concentration of salt is not seemingly of particular importance. Solutions of 2% to 10% are particularly convenient and economical to use.

Additional details will be evident from the following descriptions of specific applications of aluminum-treated anion exchange resins to the improvement of fluorine-containing water. A one inch glass column was filled with about 250 ml. of a resin prepared by reacting phenol, formaldehyde, and tetraethylene pentamine to form a gel and then drying the gel at 125° C. The resulting insoluble resin was crushed to a 20/40 mesh size before being placed in the column. The column was then flooded with a solution containing 500 P. P. M. of hydrochloric acid. There was then poured through the column a 5% solution of aluminum sulfate, which was then drained from the column. After a single rinse to remove excess aluminum solution a water containing 107 parts per million of fluoride ion was passed through the column downflow at a rate of 2 gallons per square foot per minute. Samples were taken until the effluent gave a test for fluorine. Up to this point 7500 ml. of water had been obtained which gave a completely negative test for fluorine. This example demonstrates the sharp "break-through" which is characteristic of the anion exchange resins impregnated with aluminum salts.

The capacities of various types of exchange materials were compared in the following way. Samples of waters were prepared containing 50, 25, and 10 P. P. M. of fluoride ion as sodium fluoride and divided into 100 ml. lots. Various materials were then treated with a 4% solution of commercial aluminum sulfate, rinsed with desalted water, and dried. Lots of 0.200 g. were weighed out and placed in the 100 ml. portions of the prepared solutions. The solutions with treating agents were stirred and after two hours were examined for changes in fluoride content by a colorimetric method using zirconyl salts and alizarin red. Capacities for absorption of $F^-$ were then calculated in milligrams of $F^-$ per gram of dry treated resin. An aluminum treated synthetic gel zeolite absorbed 4.8, 1.8, and 1.8 mgm. per g. for the 50, 25, and 10 P. P. M. solutions respectively. Sample of an aluminum-treated sulfonated coal absorbed 10.8, 5.7, and 3.2 mgm. per g. for the 50, 25, and 10 P. P. M. fluoride solutions respectively. Comparable figures for a specially prepared tricalcium phosphate were 7.2, 5.1, and 3.6 mgm. per g. respectively. The highest absorptive capacity in this series of tests was shown by a gelled, insolubilized, and aluminum salt treated resin from phenol, formaldehyde, and triethylene tetramine, for which the absorptive capacities were 13.8, 9.2, and 5.7 mgm. per g. for the solutions containing 50, 25, and 10 P. P. M. of fluoride ion respectively. The superior capacity of the absorbents of this invention is plainly evident.

A gelled and insolubilized anion exchange resin from the reaction of metaphenylenediamine and formaldehyde was treated with a 10% solution of aluminum sulfate and rinsed. A solution containing 40 P. P. M. of $F^-$ as sodium fluoride was then passed downflow over 100 cc. of the resin until fluorides appeared in the effluent. The apparent capacity of this resin was about 1100 grains $F^-$ per cu. ft.

A gelled and heat-hardened resin made from phenol, formaldehyde, and triethylene tetramine and granulated to a 20/30 mesh size was placed in a one inch column. A 4% solution of aluminum sulfate was passed therethrough, after which the column was rinsed with water desalted by passage through a base exchanger in its hydrogen form followed by an anion exchange resin. Thereupon water containing 500 P. P. M. of $F^-$ was passed through the column downflow and tests made for fluoride ion for each 250 ml. passed therethrough. After 1250 ml. had been treated, there was still no fluorine in the water but after 1500 ml. of water had been treated, the effluent contained 5 P. P. M. of fluoride, while after 1750 ml. had been treated, the effluent contained 35 P. P. M. of fluoride. With complete removal of fluoride the aluminum treated anion exchange resin absorbed over 1200 grains of fluoride ion per cubic foot. The pH of all samples of water tested remained close to 7%.

When the resin in the column had been saturated with fluorine, the resin was reconditioned by washing with a 4% solution of sodium carbonate. It was noted that this treatment removed both fluorine and aluminum from the resin, but the rate of fluorine removal was much more rapid than that of aluminum. The resin was given a rinse with water, then with a little dilute hydrochloric acid, and again with water. The column was then flooded with a 4% solution of aluminum sulfate and rinsed. The resin was again used for removing fluorine from water with the same end result, namely, a capicity of over 1200 grains of fluoride ion per cubic foot. It is interesting to note that for a bed volume of 250 ml. all of the absorbed fluorine can be removed with less than two liters of a 4% solution of soda ash and that the capacity for absorption is retained on repeated regeneration and reuse.

In order to emulate actual field conditions Philadelphia tap water was fortified with 6.5 P. P. M. of fluoride ion by addition of an equivalent amount of sodium fluoride. This water was passed downflow through a small column packed with 226 ml. of a resin like that used immediately above. The rate of passage was 5 gallons per square foot per minute with a time of retention in the column of three to four minutes. The first 99 liters of effluent were entirely free of fluorine, while after 119 liters had passed, the effluent contained less than two parts per million of fluoride ion and did not exceed a fluoride content of 2 P. P. M. until after 159 liters had passed through the column. During the treatment of this water samples were examined from time to time for chloride and sulfate content. It was found that the chloride ion concentration decreased slightly at first and tended to increase slightly after prolonged use of the resin. The concentration of sulfate ion, however, tended to increase somewhat at the start, since aluminum sulfate had been used to treat the resin. The effluent was found palatable and potable and the greater part of the effluent examined was at or below the limit of safety for human use.

By methods generally similar to those described there have been studied anion exchange resins activated for selective fluorine absorption with 2% to 5% solutions of aluminum chloride, aluminum nitrate, ammonium alum, and aluminum sulfate. In every case aluminum was taken up by the resin as established by actual analysis. The aluminum appeared to be firmly bound and to show an absorption capacity for fluorine roughly in proportion to the aluminum content of the resin. Resins treated with the various salts were tested with a synthetic water made up from distilled water to contain nitrate at 6 P. P. M., chloride at 30 P. P. M., sulfate at 120 P. P. M., bicarbonate at 400 P. P. M. and fluoride at 10 P. P. M. The pH of this water was 8.1. Other synthetic waters were made from distilled water with 200 P. P. M. of $CaCl_2.2H_2O$, 100 P. P. M. of $MgSO_4.7H_2O$, 100 P. P. M. of sodium chloride, 0.60 P. P. M. of iron, and 0.38 P. P. M. of ammonia from ferrous ammonium sulfate, and various controlled concentrations of sodium fluoride. The pH of these synthetic waters was 5.9. In every instance fluoride removal took place in a satisfactory manner. The other ions were removed only to a limited extent except for iron which was completely removed. The results showed that the aluminum sulfate treated resins were somewhat superior to the resins treated with other salts, but capacities in all cases were highly satisfactory. Further tests showed that not only may iron be removed, but also other metals yielding insoluble hydroxides, such as copper. The simultaneous removal of fluoride and heavy metals is of practical importance.

The use of aluminum-impregnated anion exchange resins for the reduction or removal of the fluorine-content of fluorine-containing waters presents many advantages over any method heretofore proposed. By the process described above fluorine-containing waters are rendered potable by selective sorption of fluorine from fluorine-containing water supplies in an economical and practical way. The insoluble anion-exchange resins, particularly those of the phenol-formaldehyde type having aminomethyl substituents, are ideal bases for holding aluminum compounds which may then be used to sorb the fluorine content of water. The presence of other soluble compounds than those containing fluorine does not interfere with the process and heavy metals are removed along with the fluorine.

The process is rapid because of the nature of the resin bases used and lends itself to continuous flow methods. By the use of two or more columns packed with anion exchange resin the removal of fluorine and regeneration may be carried on without interruption in the supply of water. When a bed of aluminum-treated anion exchange resin has become saturated with respect to fluorine, the bed may readily be freed from its fluorine content by a simple treatment with an alkaline solution. Excess alkali may be removed, if desired, with a little dilute acid. The bed may then be impregnated again with a solution of an aluminum salt and used again for sorption of fluorides with high efficiency.

We claim:

1. The process of reducing the fluorine content of fluorine-containing waters below the toxic limit which comprises contacting a fluorine-containing water with a water-insoluble anion exchange resin which has been impregnated with an aqueous solution of an aluminum salt in an amount at least sufficient to absorb the toxic concentration of said fluorine from said water and separating from said resin the water which has been contacted therewith.

2. The process of reducing the fluorine content of fluorine-containing waters below the toxic limit which comprises contacting a fluorine-containing water with a water-insoluble anion exchange resin which has been impregnated with an aqueous solution of aluminum sulfate in an amount at least sufficient to absorb the toxic concentration of said fluorine from said water and separating from said resin the water which has been contacted therewith.

3. The process of reducing the fluorine content of a fluorine-containing water below the toxic limit which comprises contacting said water with a water-insoluble, gelled, and heat-hardened phenol-formaldehyde resin which has nuclear aminomethyl substituents, which is capable of absorbing acidic constituents from fluids, and which is impregnated with an aqueous solution of an aluminum salt in an amount at least sufficient to absorb the toxic concentration of said fluorine from said water and separating from said resin the water which has been contacted therewith.

4. The process of reducing the fluorine content of a fluorine-containing water below the toxic limit which comprises contacting said water with a water-insoluble, gelled, and heat-hardened phenol-formaldehyde resin which has nuclear aminomethyl substituents, which is capable of absorbing acidic constituents from fluids, and which is impregnated with an aqueous solution of aluminum sulfate in an amount at least sufficient to absorb the toxic concentration of said fluorine from said water and separating from said resin the water which has been contacted therewith.

5. The process of reducing the fluorine content of a fluorine-containing water below the toxic limit which comprises contacting said water with a water-insoluble, gelled, and heat-hardened resin from phenol, formaldehyde, and a polyalkylene polyamine, said resin being suitable for the absorption of acidic constituents from fluids and being impregnated while mainly in its basic form with an aqueous solution of an aluminum salt in an amount sufficient to absorb the toxic fluorine content of said water, and separating from said resin the water which has been contacted therewith.

6. The process of claim 5 wherein the aluminum salt is aluminum sulfate.

7. The process of reducing the fluorine content of a fluorine-containing water below the toxic limit which comprises contacting said water with a water-insoluble, gelled, and heat-hardened resin from phenol, formaldehyde, and triethylene tetramine, said resin being suitable for the absorption of acidic constituents from fluids and being impregnated while mainly in its basic form with an aqueous solution of an aluminum salt in an amount sufficient to absorb the toxic fluorine content of said water, and separating from said resin the water which has been contacted therewith.

8. The process of claim 7 wherein the aluminum salt is aluminum sulfate.

9. The process of reducing the fluorine content of a fluorine-containing water below the toxic limit which comprises contacting said water with a water-insoluble, gelled, and heat-hardened resin from a methylol-forming phenol, formaldehyde, and a polyalkylene polyamine, said resin being suitable for the absorption of acidic constituents from fluids and being impregnated while mainly in its basic form with a 2% to 10% aqueous solution of an aluminum salt, and separating from said resin the water which has been contacted therewith.

10. A cyclic process for treating fluorine-containing water and reducing the fluorine content thereof which comprises the steps of impregnating a water-insoluble anion exchange resin chiefly in its basic form with an aqueous solution of an aluminum salt in an amount sufficient to absorb the toxic fluorine content of said water, contacting the resin impregnated as aforesaid with fluorine-containing water to sorb the toxic fluorine content thereof on the impregnated resin, thereupon separating the water and the resin, treating the resin having a sorbed fluorine content with an alkaline solution until the fluorine content is removed, and repeating the above steps cyclically.

11. A cyclic process for treating fluorine-containing water and reducing the fluorine content thereof below the toxic limit which comprises the steps of treating a water-insoluble anion exchange resin in its basic form with a dilute solution of an acid in an amount sufficient to convert from about 1% to about 6% of the resin to its acid form, impregnating the treated resin with an aqueous solution of an aluminum salt in an amount sufficient to give capacity for absorbing the toxic fluorine content of said water, contacting the resulting aluminum-impregnated resin with the fluorine-containing water and sorbing thereon the toxic fluorine content, separating the water and the resin, treating the resin having a sorbed fluorine content with an alkaline solution until the fluorine content thereof is removed, and repeating the above steps cyclically.

12. A cyclic process for treating fluorine-containing water and reducing the fluorine content thereof below the toxic limit which comprises the steps of treating a water-insoluble, gelled, and heat-hardened phenol-formaldehyde resin which has nuclear aminomethyl substituents, which is suitable for the absorption of acidic constituents, and which is in its basic form, with a dilute solution of an acid in an amount sufficient to convert from about 1% to about 6% of the resin to its acid form, impregnating the treated resin with an aqueous solution of an aluminum salt in an amount sufficient to give capacity for absorbing the toxic fluorine content of said water, contacting the resulting aluminum-impregnated resin with the fluorine-containing water and sorbing thereon the toxic fluorine content, separating the water and the resin, treating the resin having a sorbed fluorine content with an alkaline solution until the fluorine content thereof is removed, and repeating the above steps cyclically.

13. A cyclic process for treating fluorine-containing water and reducing the fluorine content thereof below the toxic limit which comprises the steps of treating a water-insoluble anion exchange resin in its basic form with a dilute solution of an acid in an amount sufficient to convert from about 1% to about 6% of the resin to its acid form, impregnating the treated resin with a 2% to 10% aqueous solution of an aluminum salt, contacting the resulting aluminum-impregnated resin with the fluorine-containing water and sorbing thereon the toxic fluorine content, separating the water and the resin, treating the resin having a sorbed fluorine content with an alkaline solution until the fluorine content thereof is removed, and repeating the above steps cyclically.

14. The cyclic process of claim 13 in which the aluminum salt is aluminum sulfate.

ROBERT J. MYERS.
DONALD S. HERR.